(12) United States Patent
Woodworth et al.

(10) Patent No.: US 8,382,188 B2
(45) Date of Patent: Feb. 26, 2013

(54) SELF-ADJUSTING AND SELF-ALIGNING ACCESS DOOR

(75) Inventors: Jacob S. Woodworth, Lowell, IN (US); Craig W. Gurtatowski, Crown Point, IN (US); William A. Purdy, Plainfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/392,731

(22) PCT Filed: Jul. 23, 2010

(86) PCT No.: PCT/US2010/042993
§ 371 (c)(1),
(2), (4) Date: Feb. 27, 2012

(87) PCT Pub. No.: WO2011/025606
PCT Pub. Date: Mar. 3, 2011

(65) Prior Publication Data
US 2012/0153661 A1 Jun. 21, 2012

Related U.S. Application Data

(60) Provisional application No. 61/238,248, filed on Aug. 31, 2009.

(51) Int. Cl.
*B60K 15/05* (2006.01)

(52) U.S. Cl. .................................................. 296/97.22
(58) Field of Classification Search ............... 296/97.22
See application file for complete search history.

(56) References Cited

U.S. PATENT DOCUMENTS

| 6,702,357 | B2 | 3/2004 | Joerg et al. | |
|---|---|---|---|---|
| 7,618,078 | B2 * | 11/2009 | Gerner | 296/97.22 |
| 2009/0189410 | A1 | 7/2009 | Gurtatowski et al. | |

FOREIGN PATENT DOCUMENTS

| DE | 10026841 A1 | 12/2001 |
|---|---|---|
| EP | 1281558 A2 | 2/2003 |
| EP | 1574381 A2 | 9/2005 |
| FR | 2889116 A1 | 2/2007 |

OTHER PUBLICATIONS

ISR for PCT/US2010/042993 dated Oct. 26, 2010.

* cited by examiner

*Primary Examiner* — Joseph Pape
(74) *Attorney, Agent, or Firm* — Mark W. Croll; Paul F. Donovan

(57) ABSTRACT

The connection of a vehicle fuel fill system access door to an access door hinge includes exposed guide members on the access door and the hinge to assist an installer in properly positioning and moving the access door relative to the hinge. Spacing structures between the access door and the access door hinge have a variable relationship for accommodating part variations. An audible sound is generated as the door is connected to indicate final positioning of the door on the hinge.

19 Claims, 5 Drawing Sheets

SELF-ADJUSTING AND SELF-ALIGNING ACCESS DOOR

CROSS-REFERENCE TO RELATED APPLICATIONS

The present application is national phase of PCT/US2010/042993 filed Jul. 23, 2010, and claims the benefits of U.S. Provisional Application Ser. No. 61/238,248 filed on Aug. 31, 2009.

FIELD OF THE INVENTION

The present invention relates generally to automobile fuel fill systems, and, more particularly, the invention pertains to structures aiding and facilitating the assembly of an access door on an access door hinge on automobiles.

BACKGROUND OF THE INVENTION

In a known automobile configuration, a fuel fill pipe is accessed through a fuel fill door located in a vehicle body side opening. The opening contains a fuel fill system housing which protects the end of the fuel fill pipe, and an access door hinge connects the fuel fill door to the housing. It is known to provide the fuel fill doors in the same color as the body panels adjacent the door and to fit the access door surface smoothly into the contour of the body panel in which it is located. It is known also to provide the fuel fill system housings and the plastic fuel fill doors separately to the vehicle assembly plants because the doors require painting to match the vehicle body. The access doors either are painted with the vehicle body in the assembly plant, or are painted in a separate outside vendor location and provided to the assembly plant in a painted condition. In either situation, it is common that the access door is installed onto the vehicle in a separate location from the housing installation. It is often desired that the access door and hinge attachment features are not visible to the customer, thereby providing a cleaner, more aesthetically appealing and upscale appearance for the vehicle.

It can be difficult to align the access door correctly for attachment to the access door hinge in the environment of an assembly line. By hiding attachment features from the consumer in the final installation, the attachment features are also hidden from or difficult to be seen by the assembly line worker. This can slow the worker's performance, especially if the worker has several operations to complete on each vehicle. Accordingly, to increase assembly plant efficiency, there is value in simplifying the assembly line workers' job requirements. A difficult to align door may also increase worker stress and frustration. As a result of difficult alignment, the assembly line worker might not properly or fully install the fuel fill system access door on the access door hinge. This may later surface as a quality issue if the door becomes detached from the hinge and/or has poor appearance or fit in relation to the vehicle body side.

Another problem that can arise is in fitting the access door and access door hinge together so as to achieve a no gap assembly. The door to hinge interface is designed with a specified fit relationship between confronting parts; however, due to manufacturing variations, a specific combination of a hinge and a door may have an actual fit relationship different from the designed relationship. In a known assembly procedure, the parts are tested fit together, which of course requires additional time. Any looseness between the test fitted parts is measured, and if the looseness is within the design parameters, tunable surfaces are modified to eliminate the gap and achieve a no gap assembly. If the measured gap is outside of the design parameters, such that adjustment would not achieve the desired fit, the parts are not used, and are therefore wasted. With the target being a no gap fit in the final assembly, installation efforts are high and the possibility of improper installation are also high.

Known designs for access doors and access door hinges provide no definitive signal or indication to the installer that the parts are fully, completely and correctly installed. An installer may believe that the door has been attached completely when the door remains out of position slightly relative to the hinge on which it is installed. Further, known designs require high assembly force, which can lead to installer fatigue and incompletely attached access doors.

Accordingly, it is desirable to provide a construction in which a no gap installation can be achieved without requiring pre-installation fitting and adjustment of the parts, a construction which tolerates a wider range in manufacturing variations, a construction which provides visible cues and physical control of part positioning during assembly, and/or a construction which assembles easily with minimal force to thereby reduce installer fatigue.

SUMMARY OF THE INVENTION

A self-adjusting and self-aligning access door for automobiles is provided with attachment features that also function as visible alignment targets and installation guides for an installer. Slots and rails on the hinge and door guide the installation to its proper position. Inclined and deflectable confronting surfaces ease installation and accommodate variations in paired component part makeup.

In one aspect of a form of a self-adjusting and self-aligning access door for automobiles, a vehicle fuel fill system is provided with a fuel fill system housing and an access door hinge operatively connected to the fuel fill system housing. The access door hinge includes an arm and an access door support at a distal end of the arm. The access door support has a rim and a guide slot defining a shaped opening through the rim. An access door is connected to the access door hinge, the access door including a guide rail of a shape and size for fitting in the guide slot. Cooperative connecting features on the access door support and the access door connect together the access door support and the access door.

In another aspect of a form of a self-adjusting and self-aligning access door for automobiles a vehicle fuel fill system is provided with an access door hinge including an arm and an access door support at a distal end of the arm, the access door support having either a guide slot or a guide rail. An access door is connected to the access door hinge, the access door having the other of the guide slot and the guide rail. The guide slot defines a shaped opening, and the guide rail is of a size and shape for closely fitting in the guide slot. One of the access door support and the access door has a deflectable tongue; and the other of the access door support and the access door has a projecting element engaging the deflectable tongue with the access door connected to the access door support.

In still another aspect, a method for connecting an access door of a vehicle fuel fill system to an access door hinge of the vehicle fuel fill system has steps of positioning a guide rail on one of the access door and the access door hinge in a guide slot on the other of the access door and the access door hinge; moving the access door and the access door hinge relative to one another and thereby sliding the guide rail and the guide slot relative to one another while retaining the guide rail in the guide slot; continuing to move the access door and the access door hinge relative to one another until an audible signal indicates a final relative positioning between the access door and the access door hinge has been achieved; and terminating the step of moving the access door and the access door hinge relative to one another after the audible signal.

Other features and advantages of the invention will become apparent to those skilled in the art upon review of the following detailed description, claims and drawings in which like numerals are used to designate like features.

Figure 1:
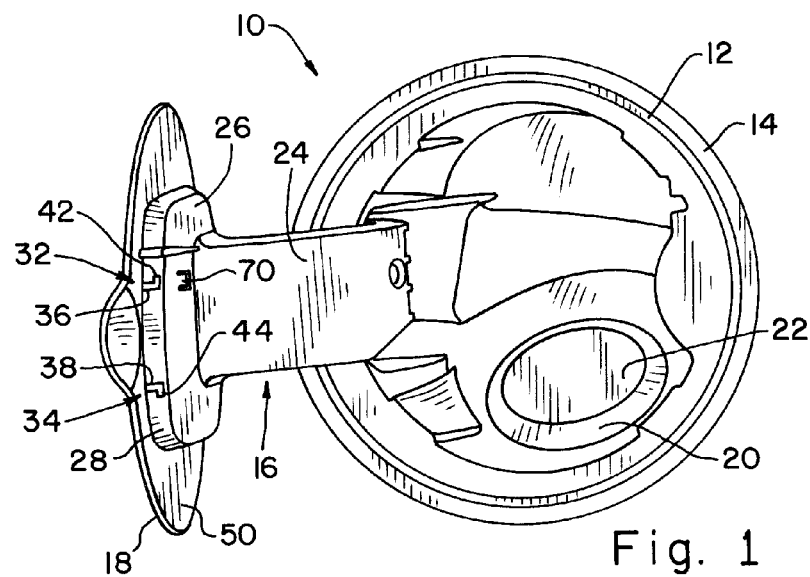
FIG. 1 is a perspective view of a vehicle fuel fill system in a vehicle body side, with a self-adjusting and self-aligning access door installed on an access door hinge.
Figure 2:
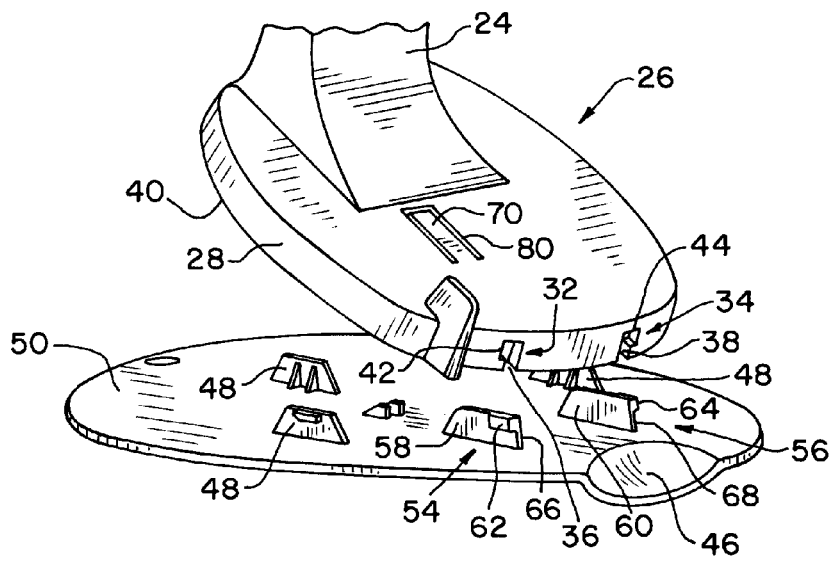
FIG. 2 is a fragmentary perspective view of an early stage in the installation of a self-adjusting, self-aligning access door on the access door hinge.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings and to FIG. 1 in particular, a vehicle fuel fill system 10 is shown, having a fuel fill system housing 12 positioned in a vehicle body side panel 14. An access door hinge 16 is pivotally connected to fuel fill system housing 12 and has an access door 18 connected thereto. Access door 18 can be of a same color as the surrounding color of side panel 14 and thus may be separately prepared apart from the vehicle fuel fill system housing and access door hinge. Fuel fill system housing 12 defines a cavity accessed through an opening that is selectively covered and exposed by movement of access door 18. Access door 18 can be moved between closed and opened positions relative to housing 12 through the pivotal movement of access door hinge 16, which can be accomplished by pulling or pushing access door 18 from the closed and opened positions thereof, respectively. Various types of locks, latches and/or spring assists mechanisms (not shown) can be incorporated into the operation of access door 18. Such mechanisms are well-known to those skilled in the art and will not be described in further detail herein.

Fuel fill system housing 12 includes a refueling nozzle access opening 20 at an inner end of housing 12 relative to the opening of housing 12 covered and exposed by the operation of access door 18. Refueling nozzle access opening 20 may be closed by a primary shutoff valve 22, as those familiar with the art will readily understand. The present invention can be used for various types of fuel fill system housings and can be adapted to use with various types, styles, designs and shapes for access door hinges and access doors. The specific configurations shown herein are merely illustrative and exemplary of the self-adjusting and self-aligning access door.

Access door hinge 16 includes an arm 24 pivotally connected to fuel fill system housing 12 and an access door support 26 at a distal or outer end of arm 24. Support 26 engages and is attached to access door 18. Support 26 includes a peripheral rim 28 projecting from the periphery of an inner surface 30 (FIG. 8) of support 26. Rim 28 engages or confronts access door 18 to conceal connecting features between access door 18 and support 26 and to provide a clean, aesthetically appealing interface between support 26 and access door 18. At the forward portion thereof, in an area readily visible to installers during assembly, peripheral rim 28 defines first and second guide slots 32, 34, which are openings through rim 28. Guide slots 32, 34 are generally L-shaped, having primary slot portions 36, 38 opening through an outer edge 40 of rim 28 and extending from outer edge 40 toward inner surface 30 of support 26. Secondary slot portions 42, 44 extend from inner ends of primary slot portions 36, 38 respectively, and extend laterally in rim 28 relative to inner surface 30 and outer edge 40.

Access door 18 is a generally plate-like body shaped to cover the outer opening to fuel fill system housing 12. In the exemplary embodiment shown, access door 18 is substantially round; however, it can be of other shapes as well. Access door 18 can be substantially flat, or can be curved as necessary to blend into the shape and contour of the body side panel in which it is located. At one edge of access door 18 of the exemplary embodiment, an outwardly curved finger grip area 46 is provided, whereby a person can insert a fingertip behind the edge of access door 18 to pull it from a closed position. Access door 18 includes one or more snap connecting feature 48, projecting from an inner surface 50 of access door 18, a plurality of such snap connecting features 48 being shown in the drawings. Snap connecting features 48 can be positioned to engage inner configurations on rim 28 or independent complementary snap connecting features such as partitions 52 projecting from inner surface 30 of support 26 within the area defined by rim 28.

Access door 18 further includes first and second guide rails 54, 56 projecting from inner surface 50 thereof. Guide rails 54, 56 are of a shape and size to be received in guide slots 32, 34 while closely fitting in guide slots 32, 34. Guide rails 54 56 include primary bodies 58, 60, respectively, extending away from inner surface 50, and lateral projections 62, 64, respectively, extending from the distal edges of bodies 58, 60 and substantially at right angles to bodies 58, 60, respectively. In the exemplary embodiment shown, projections 62, 64 are flush with forward edges 66, 68 of bodies 58, 60 and extend along side surfaces of bodies 58, 60 less than the full lengths of bodies 58, 60.

Figure 7:
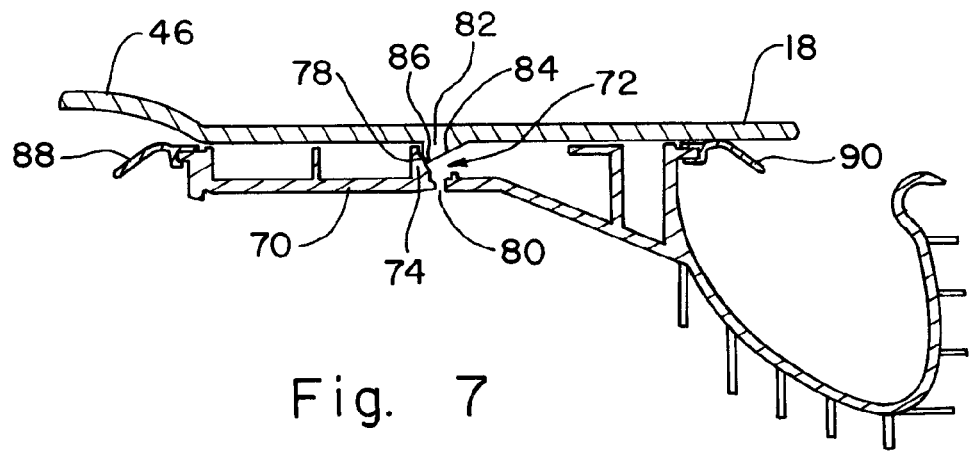
FIG. 7 is a cross-sectional view illustrating the self-adjusting feature of the access door.
Figure 8:
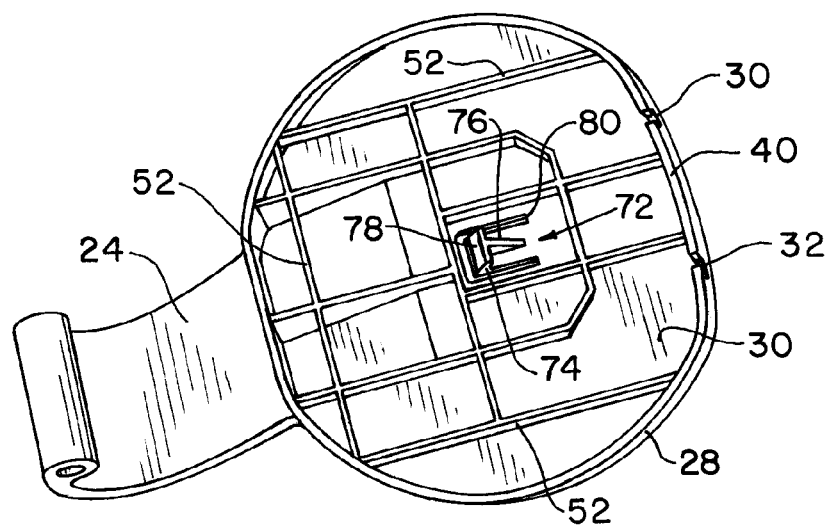
FIG. 8 is a perspective view of the access door hinge.
Figure 9:
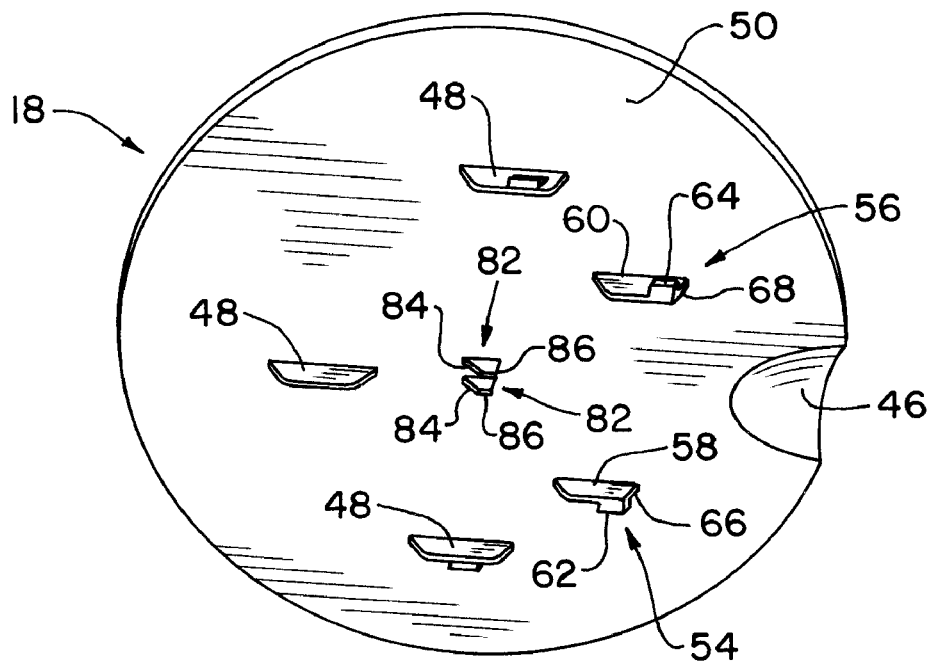
FIG. 9 is a perspective view of the inner surface of the vehicle access door.

A self-adjusting aspect of the exemplary embodiment can be seen more clearly in FIGS. 7-9. Hinge 16 includes a deflectable tongue 70 in support 26. Tongue 70 includes a ramp 72 on the inside thereof, facing inner surface 50 of access door 18. Ramp 72 includes a wall 74 and brace 76. The back side of wall 74 has an angular surface 78 facing away from guide slots 32, 34. Deflectable tongue 70 is separated on three sides from support 26 by a U-shaped void 80. Inner surface 50 of access door 18 includes an angular pedestal 82 having an angular leading edge 84 and an apex 86. In the exemplary embodiment, two such angular pedestals 82 are shown.

Figure 3:
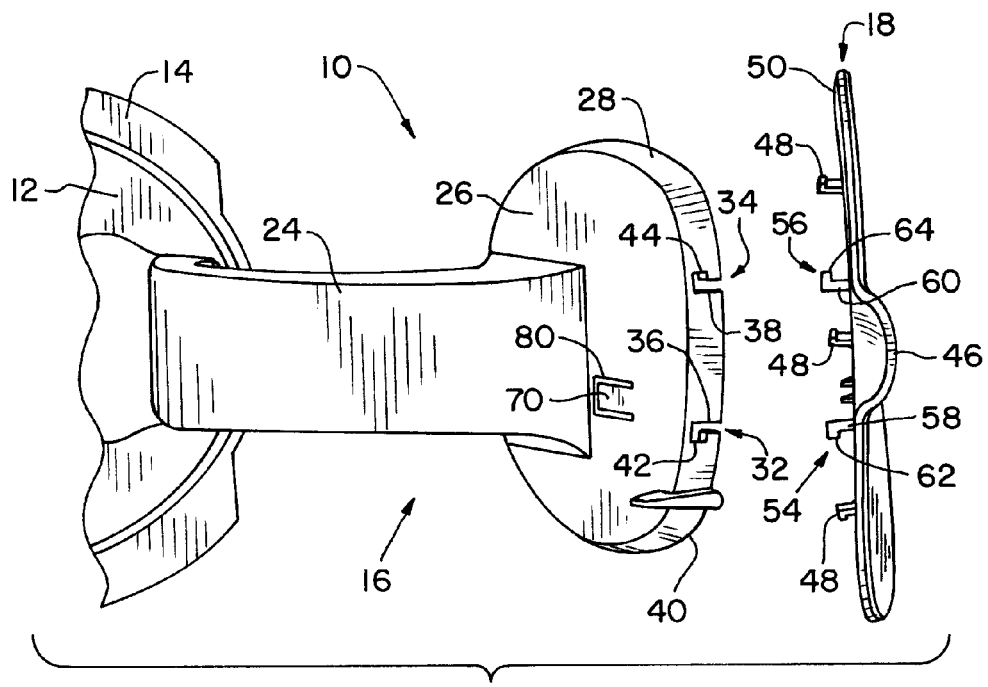
FIG. 3 is a perspective view of the access door installation at the stage depicted in FIG. 2, but showing the components from a different angle.
Figure 4:
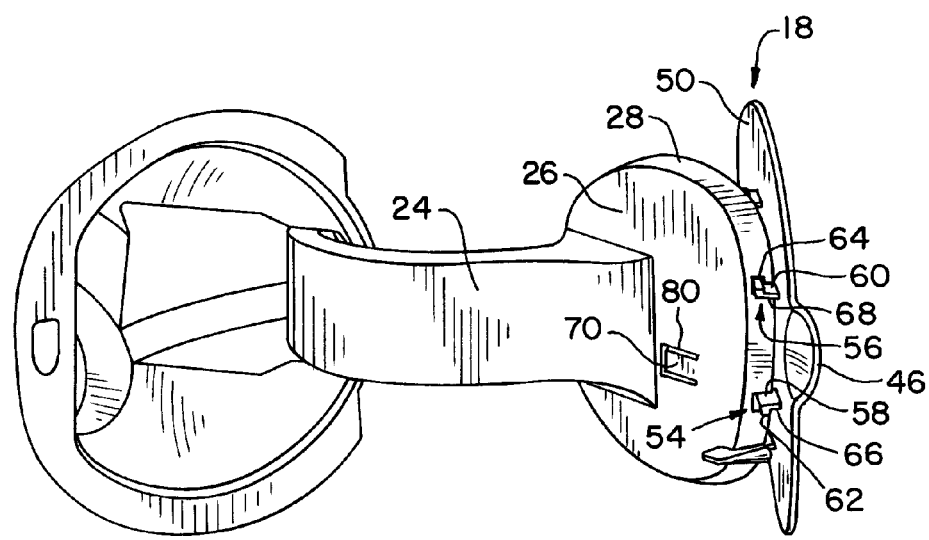
FIG. 4 is a perspective of a stage in the installation of the access door later than the stage illustrated in FIGS. 2 and 3.
Figure 5:
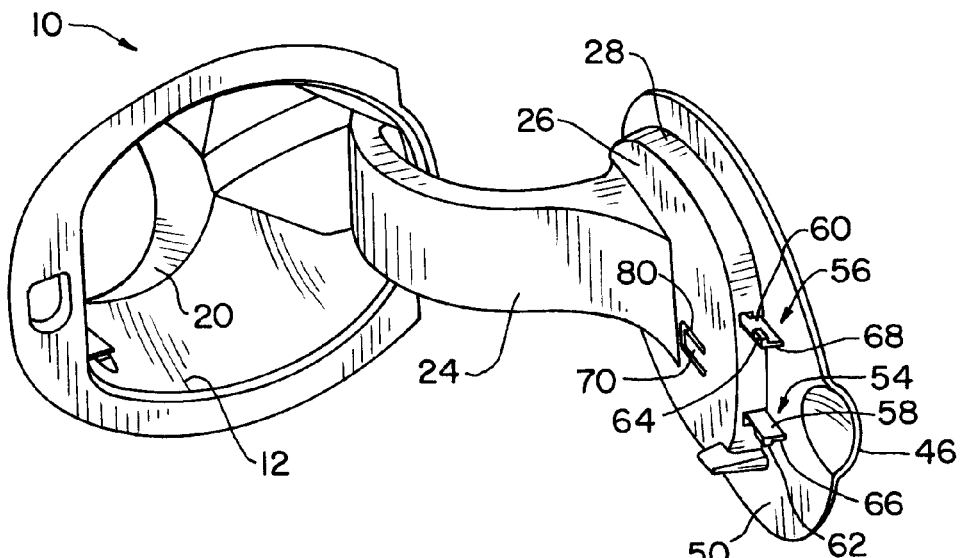
FIG. 5 is a perspective view of a still later stage in the installation of the access door.
Figure 6:
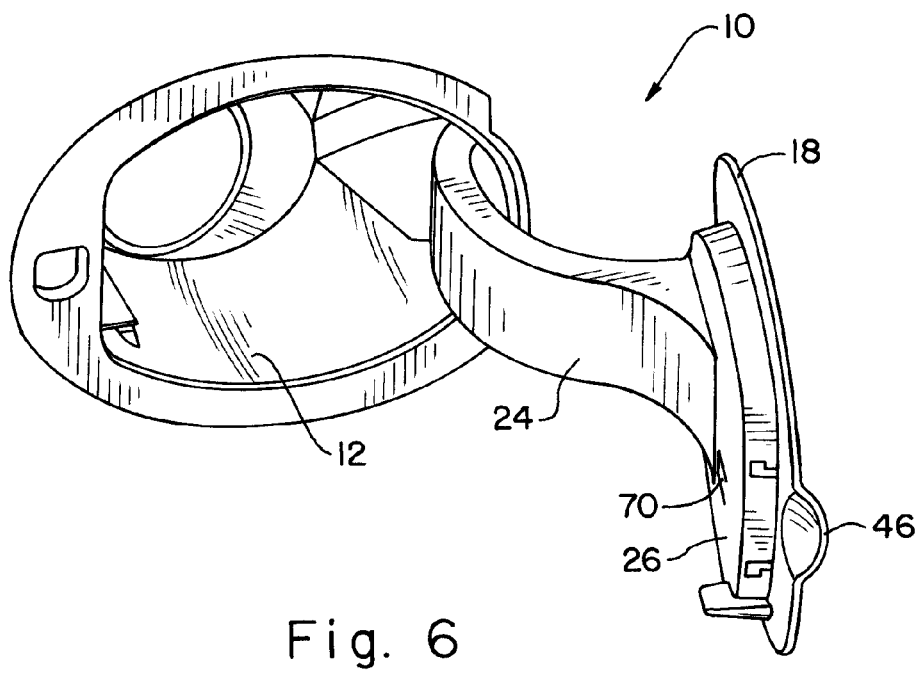
FIG. 6 is a perspective view of the completed assembly.

Access door 18 is attached to access door hinge 16 by first positioning the access door at an angle to the hinge and aligning guide rails 54, 56 with guide slots 32, 34 (FIG. 3). Guide rails 54, 56 are placed into and engage with guide slots 32, 34. Rails 54, 56, and specifically main bodies 58, 60 thereof, can be caused to enter guide slots 32, 34, and specifically primary slot portions 36, 38 of guide slots 32, 34 with projections 62, 64 outwardly of the guide slots (FIG. 4). Once bodies 58, 60 have been fully inserted, the door is rotated to a parallel position relative to support 26, with rim edge 40 against inner surface 50 (FIG. 5). A slight sliding movement of access door 18 relative to access door hinge 16 causes projections 62, 64 to enter secondary slot portions 42, 44, respectively, of L-shaped guide slots 32, 34 (FIG. 6). Snap connecting features 48 are caused to engage complimentary structures 52 in support 26, thereby securing the access door 18 on support 26. To prevent the door from backing away from its fully installed position, fore and aft snaps 88, 90 can be used between door 18 and support 26 (FIG. 7).

Figure 10:
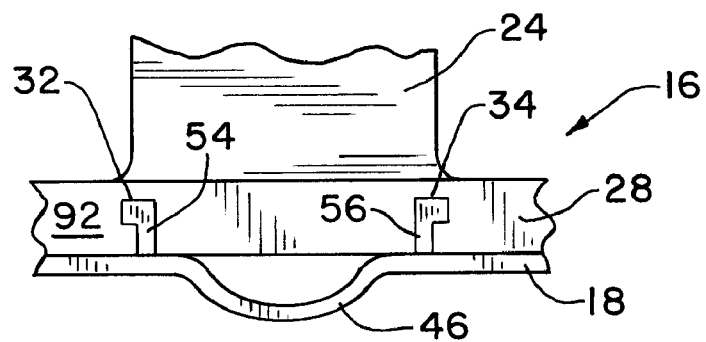
FIG. 10 is a fragmentary elevational view of the guide rails and guide slots in final positions.

As can be seen in FIGS. 1, 6 and 10, in the completed installation of access door 18 on access door hinge 16, bodies 58, 60 and projections 62, 64 substantially fill primary slot portions 36, 38 and secondary slot portions 42, 44, respectively. Forward edges 66, 68 are substantially even with an exposed outer surface 92 of rim 28, thereby providing a neat, clean appearance to the completed assembly. However, during assembly guide slots 32, 34 and rails 54, 56 are readily visible to the assembly line worker, and the sliding relationships therebetween direct sliding attachment of door 18 to hinge 16 so that proper alignment and connection of the access door relative to the access door hinge can be completed quickly and accurately. Easier installation may decrease assembly line cycle times, with positive guidance being provided by the rails in the slots for proper alignment. Higher peel off strength can be provided due to optimization of location for attachment features between the hinge support and access door.

During assembly, pedestals 82 pass along opposite sides of brace 76, and angular leading edges 84 of pedestals 82 engage the distal edge of ramp 72. Deflectable tongue 70 is thereby caused to deflect outwardly. As apexes 86 clear the distal edge of the ramp, the apexes momentarily are spaced from angular surface 78 which slopes away. Tongue 70 rebounds from the deflected position thereof until ramp 72 forcefully impacts apexes 86. A discernible sound emanates as the contact points engage, thus indicating to the installer that the fully installed position has been reached. The angular relationship of the confronting surfaces and the flexibility of tongue 70 assist in accommodating variations in the component parts, and the springiness of flexible and deflectable tongue 70 provides biasing force against cover 18 through pedestal 82. The confronting angular surfaces and the flexible, deflectable tongue ease installation and accommodate component part pairings even if relative positioning of the parts vary from designed relationships, and thereby achieve a no gap installation even with slight variations in the part makeup. Angular surface 78 supported on deflectable tongue 70 provides a variable contact relationship with apex 86 to accommodate variations in parts without requiring manual manipulation or adjustment of the parts, thereby eliminating the need for test fitting the parts together.

A self-adjusting, self aligning fuel door in accordance with the descriptions herein provides a robust, solid attachment that does not require adjustment. The designed allows for the door to install even when mating features are warped or damaged. The designed rebound contact provides a loud audible click when the part is fully installed, thereby signaling the installer that the part is fully and accurately installed. The designed gap and confronting angular surfaces allow for an ergonomically low installation effort, thereby reducing installer fatigue. The readily visible guide slots and guide rails facilitate alignment of the parts and proper movement while maintaining alignment to promote rapid and complete attachment of the fuel door to the hinge.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A vehicle fuel fill system, comprising;
  a fuel fill system housing;
  an access door hinge operatively connected to said fuel fill system housing, said access door hinge including an arm and an access door support at a distal end of said arm, said access door support having a rim and a first guide slot defining a shaped opening through said rim;
  an access door connected to said access door hinge, said access door including a first guide rail of a shape and size for fitting in said first guide slot; and
  cooperative connecting features on said access door support and said access door connecting together said access door support and said access door.

2. The vehicle fuel fill system of claim 1, said access door support having a second guide slot defining a second shaped opening through said rim, and said access door having a second guide rail of a shape and size for fitting in said second guide slot.

3. A vehicle fuel fill system, comprising:
  a fuel fill system housing;
  an access door hinge operatively connected to said fuel fill system housing, said access door hinge including an arm and an access door support at a distal end of said arm, said access door support having a rim and first and second guide slots defining shaped openings through said rim;
  an access door connected to said access door hinge, said access door including first and second guide rails of shapes and sizes for fitting in said first and second guide slots;
  cooperative connecting features on said access door support and said access door connecting together said access door support and said access door; and
  said first and second guide slots being L-shaped openings and said first and second guide rails being L-shaped bodies.

4. The vehicle fuel fill system of claim 3, said first and second guide rails including elongated bodies and lateral projections from said bodies near forward ends of said bodies.

5. The vehicle fuel fill system of claim 4, said lateral projections and said forward ends of said bodies being disposed in said first and second L-shaped openings with said access door connected to said access door support.

6. The vehicle fuel fill system of claim 5, said access door support having a deflectable tongue and said access door having a projecting element engaging said tongue with said access door connected to said access door support.

7. The vehicle fuel fill system of claim 6, one of said deflectable tongue and said projecting element engaging said deflectable tongue having an angular surface defining a variable contact relationship between said deflectable tongue and said projecting element with said access door connected to said access door support.

8. The vehicle fuel fill system of claim 1, said access door support having a deflectable tongue and said access door having a projecting element engaging said tongue with said access door connected to said access door support.

9. The vehicle fuel fill system of claim 8, one of said deflectable tongue and said projecting element engaging said deflectable tongue having an angular surface defining a variable contact relationship between said deflectable tongue and said projecting element with said access door connected to said access door support.

10. A vehicle fuel fill system, comprising:
 an access door hinge including an arm and an access door support at a distal end of said arm, said access door support having a first guide slot;
 an access door connected to said access door hinge, said access door having a first guide rail;
 said first guide slot defining a shaped opening and said first guide rail being of a size and shape for closely fitting in said first guide slot with said access door connected to said access door support;
 said access door support having a deflectable tongue; and
 said access door having a projecting element engaging said deflectable tongue with said access door connected to said access door support.

11. The vehicle fuel fill system of claim 10, said access door support including a second guide slot and said access door including a second guide rail of a shape and size for closely fitting in said second guide slot with said access door connected to said access door support.

12. The vehicle fuel fill system of claim 11, one of said deflectable tongue and said projecting element having an angular surface defining a variable contact relationship between said deflectable tongue and said projecting element with said access door connected to said access door support.

13. The vehicle fuel fill system of claim 12, said first and second guide rails including elongated bodies and lateral projections from said bodies near forward ends of said bodies.

14. The vehicle fuel fill system of claim 10, said guide rail including an elongated body and a lateral projection from said body near a forward end of said body.

15. The vehicle fuel fill system of claim 10, one of said deflectable tongue and said projecting element having an angular surface defining a variable contact relationship between said deflectable tongue and said projecting element with said access door connected to said access door support.

16. A method for connecting an access door of a vehicle fuel fill system to an access door hinge of the vehicle fuel fill system, said method having steps comprising:
 positioning a guide rail on the access door in a guide slot on the access door hinge;
 moving the access door and the access door hinge relative to one another and thereby sliding the guide rail and the guide slot relative to one another while retaining the guide rail in the guide slot;
 deflecting a tongue on the access door hinge by engagement with a pedestal on the access door while moving the access door and the access door hinge relative to one another;
 continuing said step of moving the access door and the access door hinge relative to one another until the tongue and pedestal disengage momentarily, and the tongue rebounds to generate an audible signal indicating a final relative positioning between the access door and the access door hinge has been achieved; and
 terminating said step of moving the access door and the access door hinge relative to one another after the audible signal.

17. The method of claim 16, said step of positioning including positioning a second guide rail in a second guide slot.

18. The method of claim 17, including completing said terminating step while said first and second guide rails remain partly in said first and second guide slots.

19. The method of claim 16, including completing said terminating step while said guide rail remains partly in said guide slot.

* * * * *